(12) United States Patent
Kiran (10) Patent No.: US 12,001,915 B2
(45) Date of Patent: Jun. 4, 2024

(54) SYSTEM AND METHOD FOR INTEGRATING BARCODE SCANNERS WITH A WEDGE APPLICATION

(71) Applicant: Samsung Electronics Co., Ltd., Suwon-si (KR)

(72) Inventor: Savan Kiran, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 17/673,705

(22) Filed: Feb. 16, 2022

(65) Prior Publication Data

US 2022/0398393 A1   Dec. 15, 2022

Related U.S. Application Data

(60) Provisional application No. 63/219,179, filed on Jul. 7, 2021, provisional application No. 63/208,592, filed on Jun. 9, 2021.

(51) Int. Cl.
*G06K 7/10* (2006.01)
*G06K 7/14* (2006.01)

(52) U.S. Cl.
CPC ................................. *G06K 7/1413* (2013.01)

(58) Field of Classification Search
CPC .. G06F 13/122; G06F 9/44505; G06F 13/102; G06K 7/0004; G06K 7/10; G06K 7/1413; G06Q 20/18; G06Q 20/321
USPC .................. 235/462.01, 383, 462.09, 462.1
See application file for complete search history.

(56) References Cited

U.S. PATENT DOCUMENTS

| | | | |
|---|---|---|---|
| 7,318,551 B1* | 1/2008 | Mills | G06K 7/10 235/441 |
| 2005/0194446 A1* | 9/2005 | Wiklof | G06K 7/0004 235/462.46 |
| 2013/0021346 A1* | 1/2013 | Terman | G09B 5/08 345/467 |
| 2016/0012465 A1* | 1/2016 | Sharp | G06Q 20/321 705/14.17 |
| 2016/0202996 A1* | 7/2016 | Brighton | G06F 9/4411 719/313 |
| 2019/0244043 A1 | 8/2019 | Bradley et al. | |
| 2021/0073776 A1 | 3/2021 | Pinkus | |

FOREIGN PATENT DOCUMENTS

| | | |
|---|---|---|
| CN | 106203218 B | 12/2016 |
| CN | 106375935 A | 2/2017 |
| KR | 102148954 B1 | 8/2020 |

* cited by examiner

*Primary Examiner* — Daniel St Cyr (57) ABSTRACT

A method includes receiving, at an electronic device, scanned barcode data from a barcode scanner communicatively coupled to the electronic device. The method also includes converting, by the electronic device, the scanned barcode data to a character string. The method also includes formatting, by the electronic device while executing a wedge application, the character string into formatted data compatible with an enterprise application. The method also includes providing, by the electronic device, the formatted data as an input to the enterprise application.

20 Claims, 8 Drawing Sheets

SYSTEM AND METHOD FOR INTEGRATING BARCODE SCANNERS WITH A WEDGE APPLICATION

CROSS-REFERENCE TO RELATED APPLICATION AND PRIORITY CLAIM

This application claims priority under 35 U.S.C. § 119(e) to U.S. Provisional Patent Application No. 63/208,592 filed on Jun. 9, 2021 and U.S. Provisional Patent Application No. 63/219,179 filed on Jul. 7, 2021, both of which are hereby incorporated by reference in their entirety.

TECHNICAL FIELD

This disclosure relates generally to communication between electronic devices. More specifically, this disclosure relates to a system and method for integrating barcode scanners with a wedge application.

BACKGROUND

A wedge barcode scanner is a physical device that attaches to a keyboard or a computer. The wedge barcode scanner reads barcode data and translates the barcode into a string that is then input into a system, as if a user had manually typed the string using the keyboard. Similarly, a wedge application (e.g., KNOX CAPTURE by SAMSUNG) acts as a middleware that reads barcode data captured by a device (such as a smart phone), translates the barcode into a string, formats the string, and sends the string to a third-party business or enterprise application that understands the resulting data. The wedge application takes care of integrating with the enterprise application, so that separate barcode scanning logic does not need to be built into the enterprise application, such as by using a software development kit (SDK).

SUMMARY

This disclosure provides a system and method for system and method for integrating barcode scanners with a wedge application.

In a first embodiment, a method includes receiving, at an electronic device, scanned barcode data from a barcode scanner communicatively coupled to the electronic device. The method also includes converting, by the electronic device, the scanned barcode data to a character string. The method also includes formatting, by the electronic device while executing a wedge application, the character string into formatted data compatible with an enterprise application. The method also includes providing, by the electronic device, the formatted data as an input to the enterprise application.

In a second embodiment, an electronic device includes at least one memory configured to store instructions. The electronic device also includes a processor configured when executing the instructions to receive scanned barcode data from a barcode scanner communicatively coupled to the electronic device; convert the scanned barcode data to a character string; format, while executing a wedge application, the character string into formatted data compatible with an enterprise application; and provide the formatted data as an input to the enterprise application.

In a third embodiment, a non-transitory computer readable medium contains computer readable program code that, when executed, causes at least one processor of an electronic device to receive scanned barcode data from a barcode scanner communicatively coupled to the electronic device; convert the scanned barcode data to a character string; format, while executing a wedge application, the character string into formatted data compatible with an enterprise application; and provide the formatted data as an input to the enterprise application.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smart phone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

The figures discussed below and the various embodiments used to describe the principles of this disclosure in this patent document are by way of illustration only and should not be construed in any way to limit the scope of the disclosure. Those skilled in the art will understand that the principles of this disclosure can be implemented in any suitably arranged system.

As discussed above, a wedge application acts as a middleware that reads barcode data captured by a device (such as a camera-based scanner of a mobile device or smart phone), translates it into a string, formats the string (such as adding suffixes, prefixes, or both), and sends the string to a third-party enterprise application that understands the resulting data. The wedge application takes care of integrating with the enterprise application, so that separate barcode scanning logic does not need to be built into the enterprise application, such as by using a software development kit (SDK).

Wedge applications can be used to configure scanning operations, such as which barcodes to read, how to format the data, and to which enterprise application to send the data. Such configuration parameters can be saved in a profile in the wedge application. Once the profile has been created and saved, the profiles can be pushed to end-user devices through a corresponding enterprise mobility management (EMM) operation or service. End users can then start using the enterprise application to scan barcodes.

Typically, a wedge application is configured to operate with its host device's camera-based barcode scanner. For example, a wedge application installed on a smart phone is compatible with the smart phone's camera-based barcode scanner. Many conventional wedge applications are also compatible with one (or only a few) hardware-based barcode scanners, which can be marketed as part of their solution. For example, ZEBRA's 'Data Wedge' application only works with ZEBRA's hardware barcode scanners (e.g., ZEBRA DS2278 scanner). Currently, there is no wedge application that can be configured to be compatible with any generic hardware-based barcode scanner (irrespective of vendor, like HONEYWELL, ZEBRA, DATA LOGIC, and the like) available in the market.

Conventional hand-held hardware barcode scanners typically connect to a mobile device or smart phone via BLUETOOTH or USB, and send the scanned data to the enterprise application on the mobile device. Most hardware scanners connect to the mobile device as a Human-Interface Device (HID), similar to an external keyboard, and send the scanned data as one or more keystrokes or key events. However, without the capabilities of a wedge application, there is no way to apply formatting rules to the scanned data, in order to format the scanned data before sending the scanned data to the enterprise application. Therefore, there is a need to expand the wedge application's scanning capabilities to hardware barcode scanners.

To address these and other issues, embodiments of this disclosure provide systems and methods for integrating hardware barcode scanners with a wedge application. The disclosed embodiments expand the scanning capability of the wedge application to all hardware barcode scanners seamlessly, i.e., such that the solution is vendor agnostic. Using the disclosed embodiments, enterprise personnel can connect any vendor's hardware scanner to a mobile device via Bluetooth or USB in HID mode, and create formatting and output rules in one place, i.e., in the wedge application, which works for all connected scanners. This enables enterprise personnel to easily use their existing and/or new scanners with the wedge application, while taking advantage of the wedge application's advanced data formatting and output features.

Note that while some of the embodiments discussed below are described in the context of use with consumer electronic devices, this is merely one example. It will be understood that the principles of this disclosure may be implemented in any number of other suitable contexts.

Figure 1:
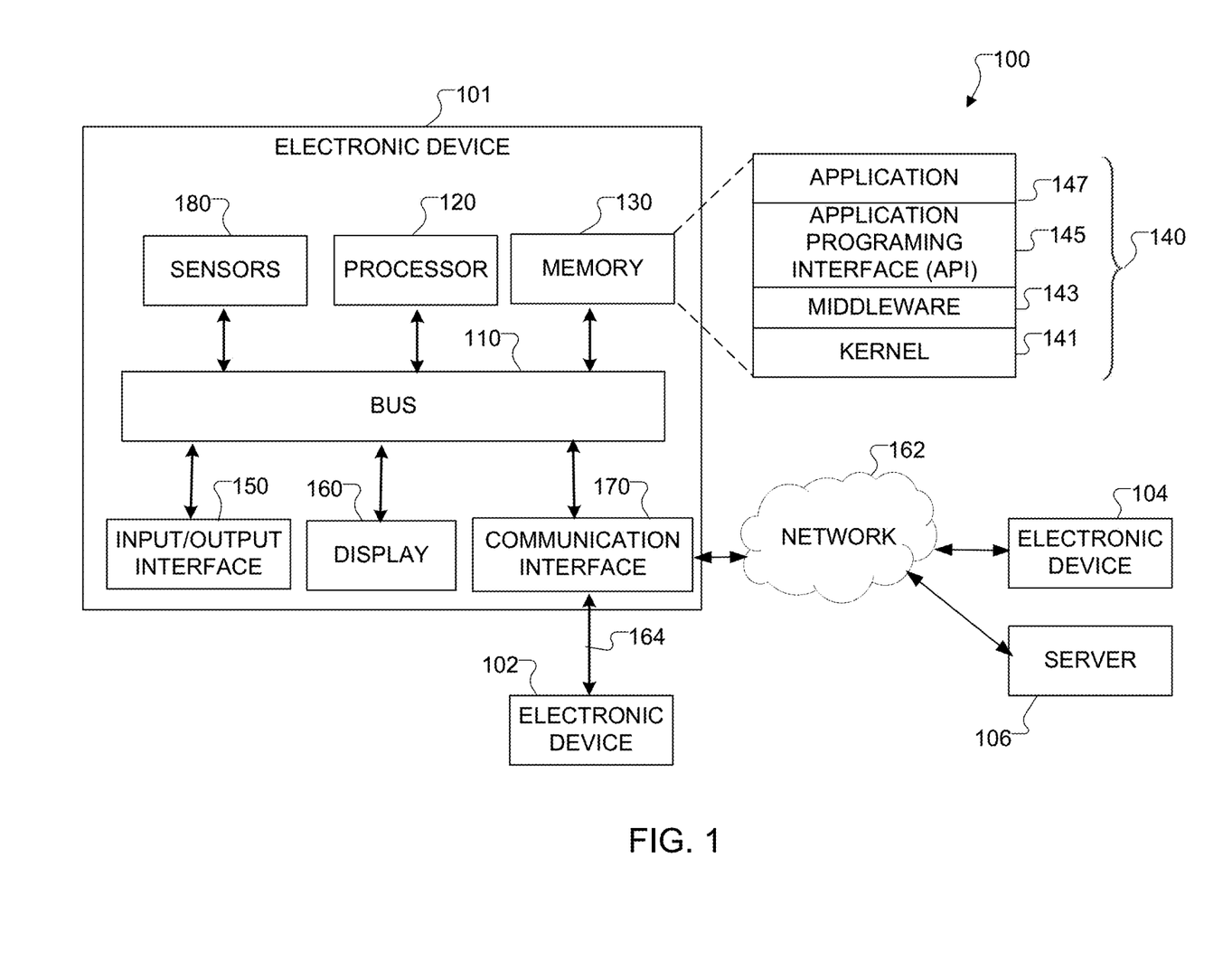
FIG. 1 illustrates an example network configuration according to this disclosure.

FIG. 1 illustrates an example network configuration 100 according to this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or a sensor 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 145 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, an active matrix OLED (AMOLED), a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a biophysical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101.

The first external electronic device 102 or the second external electronic device 104 may be a wearable device or an electronic device 101-mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving with a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
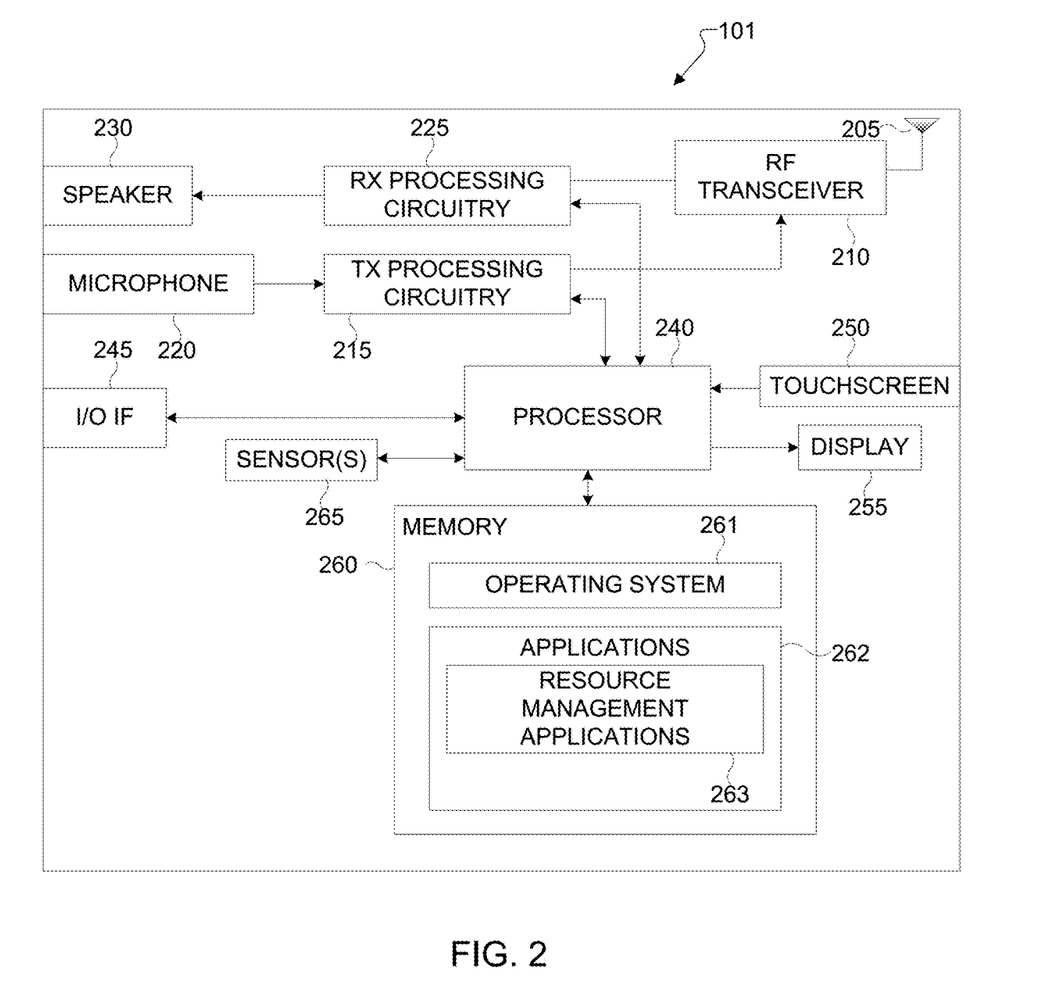
FIG. 2 illustrates an example electronic device according to this disclosure.

FIG. 2 illustrates an example electronic device 101 according to this disclosure. The electronic device 101 could represent one or more of the electronic devices 101, 102, or 104 in FIG. 1. In some embodiments, the electronic device 101 can represent a 5G capable UE. As shown in FIG. 2, the electronic device 101 includes an antenna 205, a radio frequency (RF) transceiver 210, transmit (TX) processing circuitry 215, a microphone 220, and receive (RX) processing circuitry 225. The electronic device 101 also includes a speaker 230, a processor 240, an input/output (I/O) interface (IF) 245, an input 250, a display 255, and a memory 260. The memory 260 includes an operating system (OS) program 261 and one or more applications 262.

The RF transceiver 210 receives, from the antenna 205, an incoming RF signal transmitted by another component in a system. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the processor 240 for further processing.

The TX processing circuitry 215 receives analog or digital voice data from the microphone 220 or other outgoing baseband data (such as web data, e-mail, or interactive video game data) from the processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna 205.

The processor 240 can include one or more processors or other processors and execute the OS program 261 stored in the memory 260 in order to control the overall operation of the electronic device 101. For example, the processor 240 could control the reception of forward channel signals and the transmission of reverse channel signals by the RF transceiver 210, the RX processing circuitry 225, and the TX processing circuitry 215 in accordance with well-known principles. In some embodiments, the processor 240 includes at least one microprocessor or microcontroller.

The processor 240 is also capable of executing other processes and programs resident in the memory 260. The processor 240 can move data into or out of the memory 260 as required by an executing process. In some embodiments, the processor 240 is configured to execute the applications 262 based on the OS program 261 or in response to signals received from external devices or an operator. The processor 240 can execute a resource management application 263 for monitoring system resources. The processor 240 is also coupled to the I/O interface 245, which provides the electronic device 101 with the ability to connect to other devices such as laptop computers, handheld computers and other accessories, for example, a virtual reality (VR) headset. The I/O interface 245 is the communication path between these accessories and the processor 240. The processor 240 can recognize accessories that are attached through the I/O interface 245, such as a VR headset connected to a USB port.

The processor 240 is also coupled to the input 250 and the display 255. The operator of the electronic device 101 can use the input 250 (e.g., keypad, touchscreen, button etc.) to enter data into the electronic device 101. The display 255 may be an LCD, LED, OLED, AMOLED, MEMS, electronic paper, or other display capable of rendering text and/or at least limited graphics, such as from web sites.

The memory 260 is coupled to the processor 240. Part of the memory 260 could include a random access memory (RAM), and another part of the memory 260 could include a Flash memory or other read-only memory (ROM).

The electronic device 101 further includes one or more sensors 265 that can meter a physical quantity or detect an activation state of the electronic device 101 and convert metered or detected information into an electrical signal. For example, the sensor 265 may include any of the various sensors 180 discussed above.

Although FIG. 2 illustrates one example of an electronic device 101, various changes may be made to FIG. 2. For example, various components in FIG. 2 could be combined, further subdivided, or omitted and additional components could be added according to particular needs. As a particular example, the processor 240 could be divided into multiple processors, such as one or more central processing units (CPUs) and one or more graphics processing units (GPUs). Also, while FIG. 2 illustrates the electronic device 101 configured as a mobile telephone or smart phone, electronic devices could be configured to operate as other types of mobile or stationary devices. In addition, as with computing and communication networks, electronic devices can come in a wide variety of configurations and FIG. 2 does not limit this disclosure to any particular electronic device.

Figure 3:
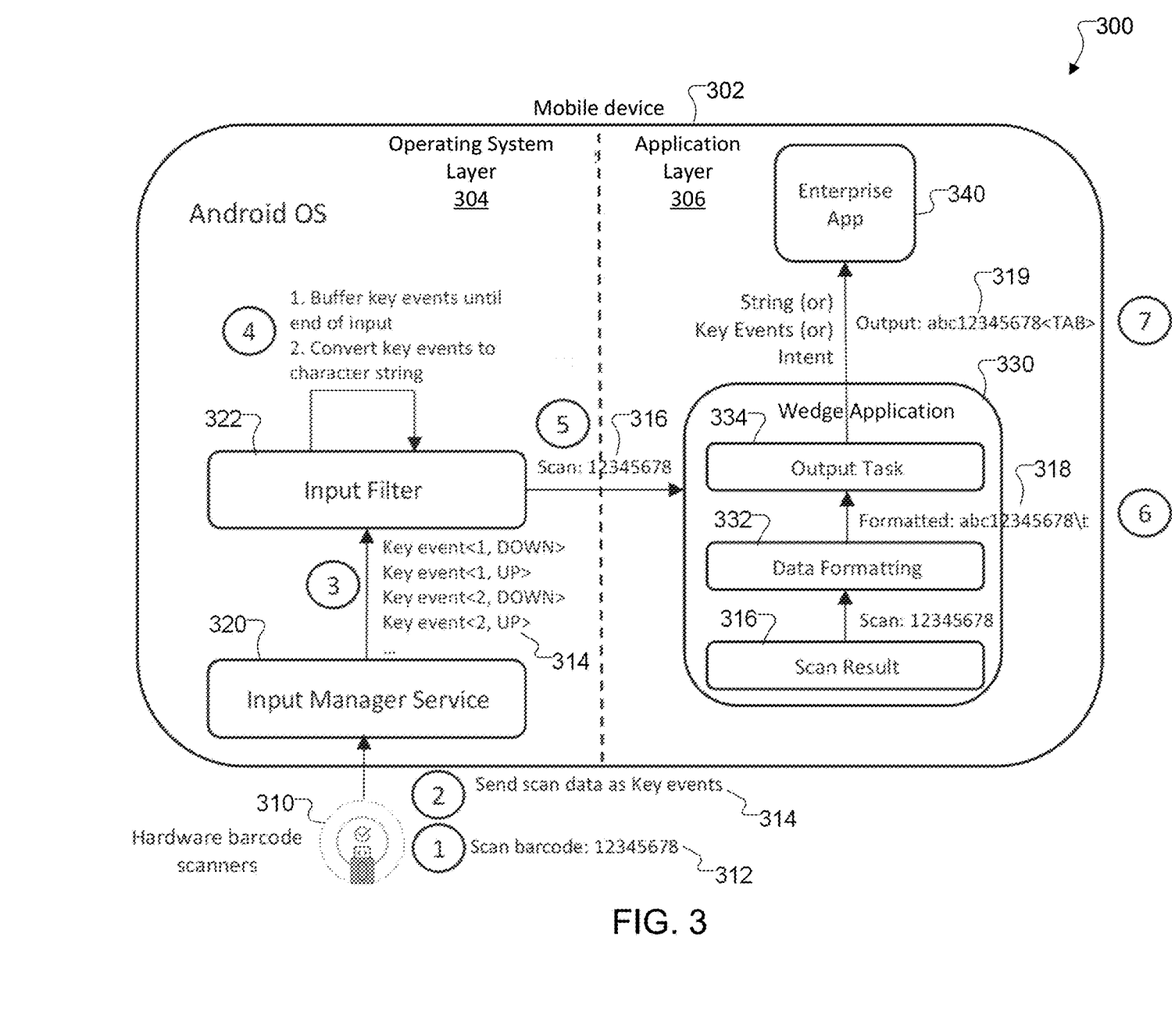
FIG. 3 illustrates an example system for integrating one or more generic hardware barcode scanners with a wedge application according to this disclosure.

FIG. 3 illustrates an example system 300 for integrating one or more generic hardware barcode scanners with a wedge application according to this disclosure. For ease of explanation, the system 300 is described as being implemented using one or more components of the network configuration 100 described above, such as the electronic device 101. However, this is merely one example, and the system 300 could include any other suitable device(s) or component(s).

As shown in FIG. 3, the system 300 includes a mobile device 302 and one or more barcode scanners 310. The mobile device 302 represents any suitable electronic device, such as a smart phone, laptop, tablet, and the like. In some embodiments, the mobile device 302 can represent (or be represented by) one of the electronic devices 101, 102, 104 of FIG. 1.

The barcode scanner 310 represents any suitable external, handheld, hardware barcode scanner that is capable of communicating with the mobile device 302. In some embodiments, the barcode scanner 310 can be a pen type scanner, a laser scanner, a camera-based 2D image detector, an omni-directional scanner, an LED scanner, or have any other suitable scanning configuration. In some embodiments, the barcode scanner 310 can include a trigger, a display screen, a processor, and a memory coupled to the processor. The memory can include instructions executable by the processor to control scanning of barcodes or other images and sharing of information with the mobile device 302. The barcode scanner 310 connects to the mobile device 302 using any suitable communication connection. In some embodiments, the barcode scanner 310 wirelessly connects to the mobile device 302 via a BLUETOOTH connection. In some embodiments, the barcode scanner 310 connects to the mobile device using a wired connection, such as a USB cable or another suitable cable. In some embodiments, the barcode scanner 310 connects to the mobile device 302 as an external keyboard in HID mode.

The mobile device 302 includes an operating system (OS) layer 304 and an application layer 306. In some embodiments, the OS layer 304 represents an Android OS layer, although this is merely one example; other operating systems are possible and within the scope of this disclosure. In the OS layer 304, the mobile device 302 can perform multiple OS layer functions, which can include an input manager service 320 and an input filter 322. In the application layer 306, the mobile device 302 can execute multiple applications, which can include a wedge application 330 and an enterprise application 340.

The input manager service 320 is a lower level service that operates within the OS layer 304 and facilitates processing of external input data. The input filter 322 operates within the OS layer 304 to intercept key events sent by the barcode scanner 310 and convert those key events to a character string to be further processed by the wedge application 330. The system 300 allows the wedge application 330 to utilize its advanced data formatting and output capabilities to format and output scanned data from the barcode scanner 310, independent of the vendor, make, or model of the barcode scanner 310, as described in greater detail below. In some embodiments, the wedge application 330 is the KNOX CAPTURE application, although other wedge applications are possible and within the scope of this disclosure. The enterprise application 340 represents any suitable application executed on the application layer 306 that can receive and use scanned barcode data, such as from the barcode scanner 310.

In one aspect of operation, the system 300 performs a scanning and data formatting process as described below. The steps are indicated by the circled numbers in FIG. 3.

At step (1), the barcode scanner 310 scans a barcode or other image and translates the barcode into scanned barcode data 312. For the purpose of example, it is assumed that the scanned barcode data 312 is '12345678'.

At step (2), the barcode scanner 310 sends the scanned barcode data 312 to the mobile device 302 as an array of key events 314. In this example (where the scanned barcode data 312 is '12345678'), the key events 314 can include <KEYCODE_1, ACTION_DOWN>, <KEYCODE_1, ACTION_UP>, <KEYCODE_2, ACTION_DOWN>, <KEYCODE_2, ACTION_UP>, . . . , <KEYCODE_8, ACTION_DOWN>, <KEYCODE_8, ACTION_UP>. The key events 314 are received at the input manager service 320.

At step (3), the input manager service 320 allows the input filter 322 to intercept the key events 314. In some embodiments, the input filter 322 is configured to intercept input data to the mobile device 302 (such as the key events 314) if it is determined that the input data originated from an external device that was designated as a hardware barcode scanner (e.g., the barcode scanner 310) compatible with the wedge application 330.

At step (4), the input filter 322 buffers the intercepted key events 314 until the mobile device 302 detects that all of the key events 314 have been received from the barcode scanner 310. In some embodiments, if there are no further key events 314 received from the barcode scanner 310 for a predetermined time duration threshold (e.g., 200 ms or any other suitable duration of time), the mobile device 302 assumes that the end of the input has been reached. The input filter 322 then converts the key events 314 to a character string 316. In this example, the input filter 322 converts the key events 314 (e.g., <KEYCODE_1, ACTION_DOWN>, <KEYCODE_1, ACTION_UP>, <KEYCODE_2, ACTION_DOWN>, <KEYCODE_2, ACTION_UP>, . . . , <KEYCODE_8, ACTION_DOWN>, <KEYCODE_8, ACTION_UP>) to a character string 316 having the value '12345678'. In some embodiments, the input filter 322 converts the key events 314 into characters, and then concatenates the characters into the character string 316.

At step (5), the mobile device 302 provides the character string 316 as an input to the wedge application 330.

At step (6), the wedge application 330 applies one or more data formatting rules 332 on the character string 316 to generate formatted output data 318. The data formatting rules 332 are applied to format the character string 316 in a format that is compatible with the enterprise application 340. In the example shown in FIG. 3, a prefix 'abc' is added to the beginning of the character string 316, and a tab character '\t' is appended to the end of the character string 316, thereby generating the formatted output data 318 having a value of 'abc12345678\t'. As described in greater detail below, the data formatting rules 332 can be configured and deployed by administrative personnel (e.g., an IT manager) or any other suitable personnel.

At step (7), the wedge application 330 performs an output task 334 to send the formatted output data 318 to the enterprise application 340, which can be currently visible on the mobile device 302. Based on one or more predetermined rules associated with the output task 334, the wedge application 330 sends the formatted output data 318 to the enterprise application 340 as input data 319 that can include one or more strings, key events, or any other suitable format. In this example, the input data 319 is sent as 'abc1234567<TAB>'.

As described above, the wedge application 330 is able to work with any suitable hardware scanner from any suitable vendor. The system enables the wedge application 330 to apply data formatting and output rules that are configured once and deployed across multiple mobile devices 302. This allows multiple mobile devices 302 to seamlessly connect to multiple hardware scanners from different vendors and send formatted scanned data to different enterprise applications according to the rules set. The system 300 does not require any vendor-specific SDK implementation and is independent of the communication channel between the mobile device 302 and the barcode scanner 310 (i.e., the barcode scanner 310 can be any of a variety of types and can connect to the mobile device via BLUETOOTH, USB, or any other suitable connection).

FIGS. 4A through 4E illustrate example display images of a user interface 400 in a process of setting up a hardware barcode scanner to work with a wedge application, according to this disclosure. For ease of explanation, the user interface 400 is described as being a part of, or otherwise associated with, the wedge application 330 and can be implemented using the mobile device 302. However, this is merely one example, and the user interface 400 could be associated with any other suitable wedge application(s) and be implemented using any other suitable device(s) or component(s).

Figure 4A:
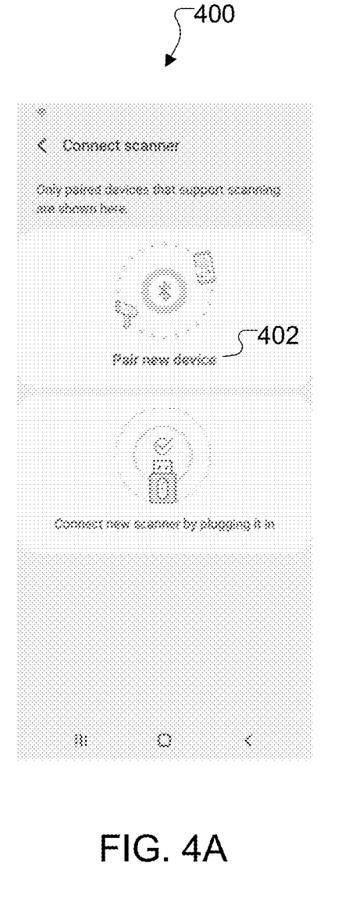
FIGS. 4A through 4E illustrate example display images of a user interface in a process of setting up a hardware barcode scanner to work with a wedge application, according to this disclosure.
Figure 4B:
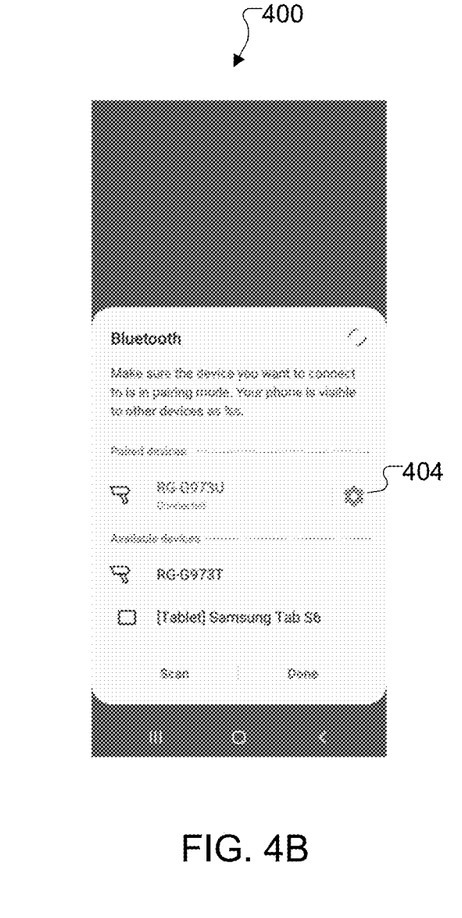

As shown in FIGS. 4A and 4B, the user interface 400 allows a user to connect the mobile device 302 to the barcode scanner 310 or any other suitable BLUETOOTH hardware barcode scanner in HID mode. As shown in FIG. 4A, the user interface 400 presents a control 402 that can be clicked or otherwise actuated by the user to pair the barcode scanner 310 to the mobile device 302. As shown in FIG. 4B, once the user clicks the control 402, the user interface 400 presents a control 404 that can be clicked or otherwise actuated by the user to connect the mobile device 302 to the barcode scanner 310. In some embodiments, the barcode scanner 310 is connected to the mobile device 302 as a HID 'keyboard' device. Those skilled in the art will understand that different but similar screens and controls may be presented at the user interface 400 if the barcode scanner 310 is connected to the mobile device 302 via USB cable or another, non-BLUETOOTH connection. Of course, in some embodiments, for a USB hardware barcode scanner, the user may be able to simply plug the USB cable from the barcode scanner into the mobile device 302 (i.e., without a device pairing operation).

Figure 4C:
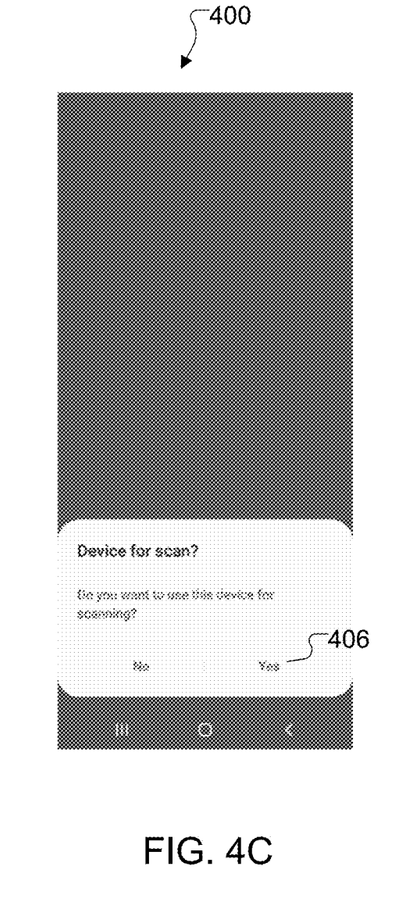
Figure 4D:
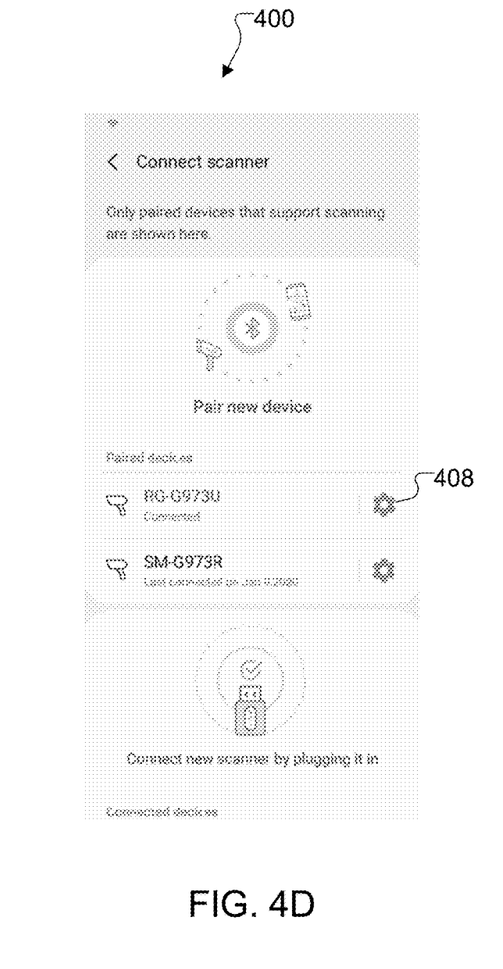
Figure 4E:
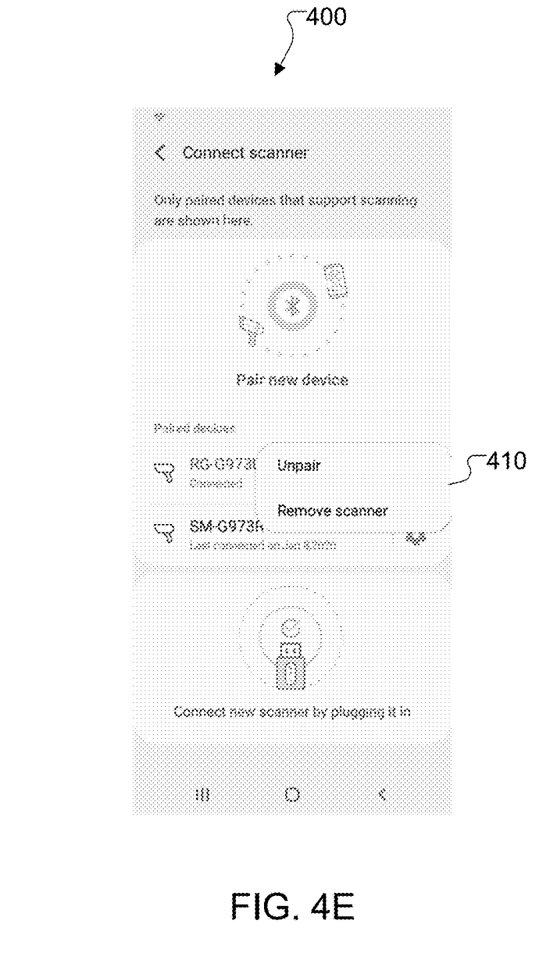

As shown in FIG. 4C, once the barcode scanner 310 is paired with the mobile device 302, the user interface 400 presents a control 406 prompting the user to confirm that the user wants to use the barcode scanner 310 with the wedge application 330. When the user confirms yes, the barcode scanner 310 is added to the scanner list for the wedge application 330. FIG. 4D shows the user interface 400 presenting a list of barcode scanners 310 that are configured to work with the wedge application 330. Once configured as such, any further scans performed by the barcode scanner 310 are routed through the data formatting and output pipeline of the wedge application 330, as opposed to the scanned data being sent directly to the enterprise application 340 and bypassing the wedge application 330. The user interface 400 also presents a control 408 for each barcode scanner 310 that can be clicked or otherwise actuated by the user to update the connection for the associated barcode scanner 310. As shown in FIG. 4E, once the user clicks the control 408, the user interface 400 presents a pop-up window 410 that allows the user to unpair or remove the barcode scanner 310.

Figure 5A:
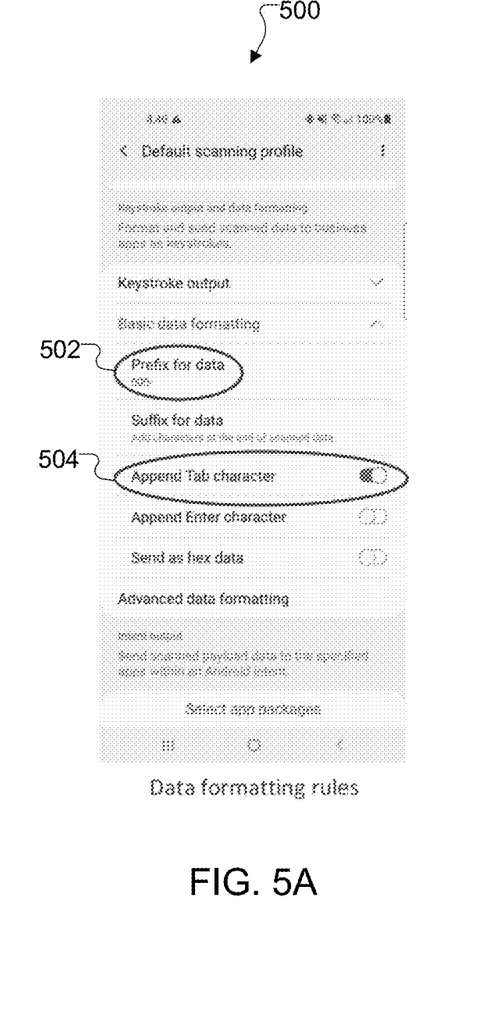
FIGS. 5A and 5B illustrate example display images of a user interface for configuring rules for a generic hardware barcode scanner to work with a wedge application, according to this disclosure.
Figure 5B:
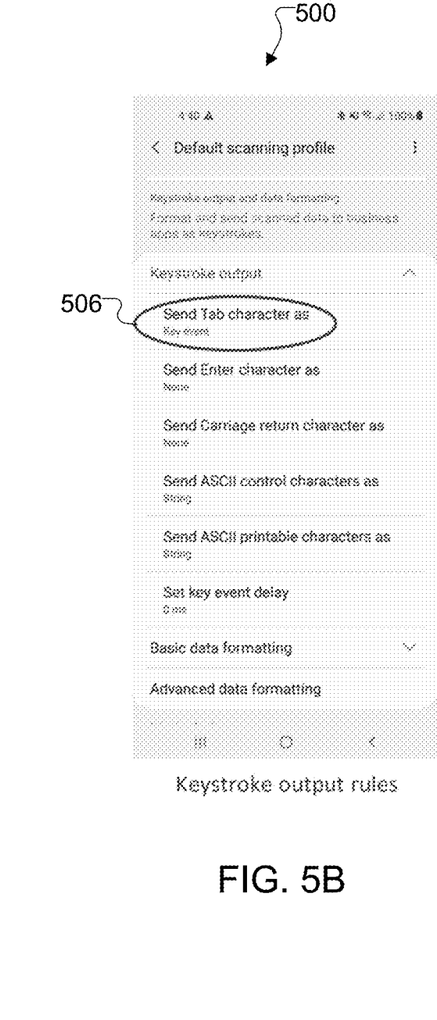

FIGS. 5A and 5B illustrate example display images of a user interface 500 for configuring rules for a generic hardware barcode scanner to work with a wedge application, according to this disclosure. For ease of explanation, the user interface 500 is described as being a part of, or otherwise associated with, the wedge application 330 and can be implemented using the mobile device 302. However, this is merely one example, and the user interface 500 could be associated with any other suitable wedge application(s) and be implemented using any other suitable device(s) or component(s). As an example, the user interface 500 could be part of a configuration application performed on an administrator device (e.g., a laptop, desktop, server, or another mobile device) and the results saved as a configuration file that is distributed or deployed to multiple mobile devices 302 that operate using the wedge application 330.

Administrative personnel (e.g., an IT employee) can use the user interface 500 to sets up formatting and output rules by creating scanning profiles in the wedge application 330, which would then be applied to scanned data. As shown in FIGS. 5A and 5B, an administrative employee has set up multiple rules directly on the mobile device 302, or on another device so that the rules can be deployed to one or more mobile devices 302.

FIG. 5A shows various data formatting rules, including formatting rules 502 and 504. The formatting rule 502 instructs the wedge application 330 to add a prefix '000-' to the character string 316 generated from the scanned barcode data 312. Similarly, the formatting rule 504 instructs the wedge application 330 to append a tab character '\t' to the character string 316 generated from the scanned barcode data 312.

FIG. 5B shows various keystroke output rules, including output rule 506. The keystroke output rules can be followed by the wedge application 330 when performing the output task 334. The output rule 506 instructs the wedge application 330 to send a <TAB> key event whenever a tab character '\t' is encountered. Thus, as shown in FIG. 3, the '\t' in the formatted output data 318 is converted to '<TAB>' in the input data 319.

Although FIGS. 3 through 5B illustrates one example of a system 300 in which a barcode scanner can be integrated with a wedge application and related details, various changes may be made to FIGS. 3 through 5B. For example, while the mobile device 302 is depicted as implementing the Android OS, the disclosed techniques can be extended to other suitable operating systems, including LINUX. Also, the system 300 is described as including a barcode scanner 310 that is of a type 'SOURCE_KEYBOARD' and is externally connected to the mobile device 302. However, the disclosed techniques for intercepting the input events to be processed by a wedge application (with preset rules) can be extended to any suitable type of external input device(s) connected to the mobile device 302 to work in conjunction with the wedge application. Such other applications can include other types of input events, including mouse pointer events, joystick events, stylus events, touchpad events, and the like. Other suitable types of external input devices can include, e.g., hardware scanners with optical character recognition (OCR) capability, which can scan printed labels with text data (e.g., a mailing address) and convert them to a character string.

In addition, the system 300 could include any number of each component in any suitable arrangement. In general, computing and communication systems come in a wide variety of configurations, and FIGS. 3 through 5B do not limit the scope of this disclosure to any particular configuration. Also, various operations in FIGS. 3 through 5B could overlap, occur in parallel, occur in a different order, or occur any number of times. Moreover, the various functions and operations shown and described above with respect to FIGS. 3 through 5B can be implemented in the system 300 or a combination of devices in any suitable manner. In general, the functions and operations can be performed using any suitable hardware or any suitable combination of hardware and software/firmware instructions.

Figure 6A:
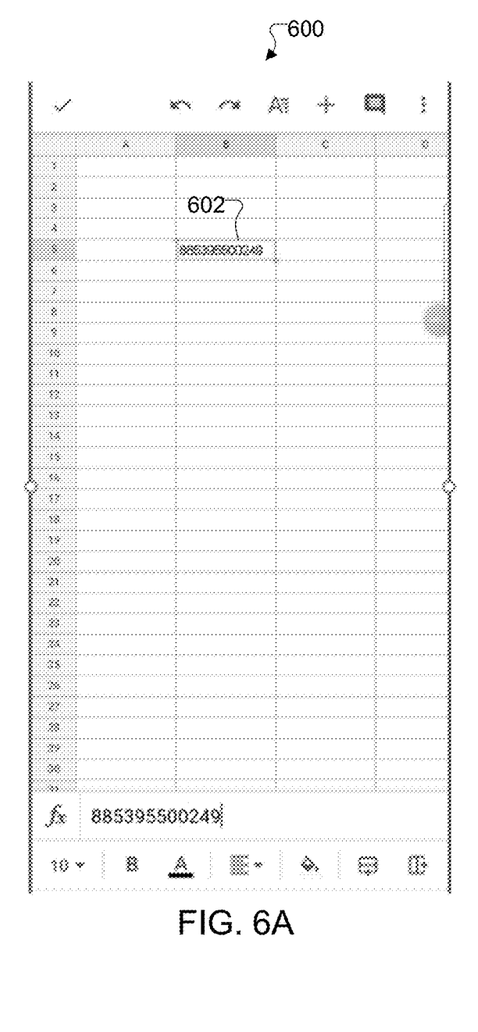
FIGS. 6A and 6B illustrate examples of benefits that can be realized using one or more of the embodiments of this disclosure.
Figure 6B:
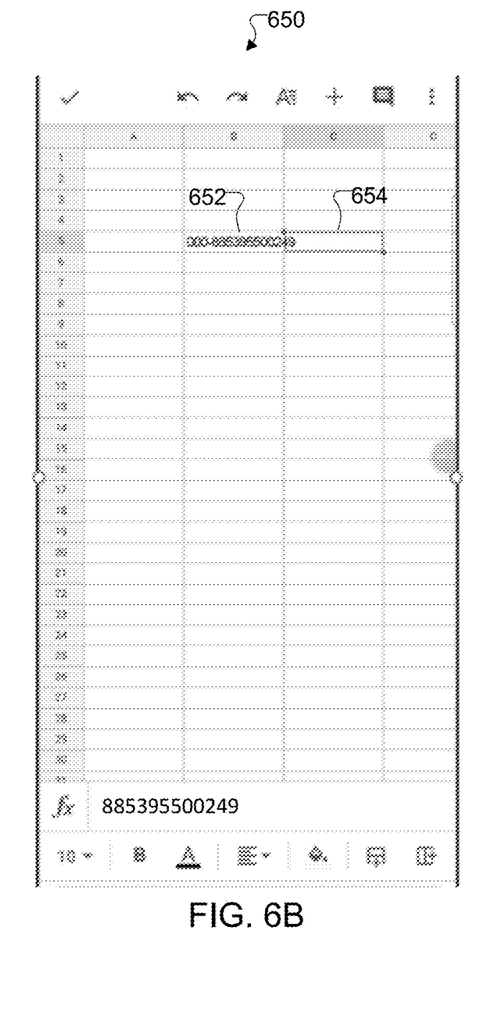

FIGS. 6A and 6B illustrate examples of benefits that can be realized using one or more of the embodiments of this disclosure. More specifically, FIGS. 6A and 6B depict a comparison between a user interface 600 of a scanning operation in a conventional HID mode without a wedge application, and a user interface 650 of the same scanning operation using one of the embodiments described above. Both user interfaces 600, 650 depict a spreadsheet application that receives data that is input based on scans of a barcode scanner.

In FIG. 6A, the user interface 600 shows the scanning operation using a hardware scanner in conventional HID mode without a wedge application. When hardware barcode scanners are connected to a mobile device (or laptop, PC, tablet, or the like) in HID mode, the barcode scanners can only send unformatted scanned data as key events. That is, no formatting rules are applied. As evident by FIG. 6A, the user interface 600 shows the scanned barcode data (equal to '885395500249') in the spreadsheet cell 602 as the string '885395500249', without any additional formatting.

In contrast, in FIG. 6B, when the barcode scanner 310 connects to the mobile device 302 and the mobile device 302 executes the wedge application 330, then scanning can be performed in advanced wedge-HID mode, which allows the application of custom data formatting and output rules. That is, the scanning workflow can be enhanced to enable formatting of the scanned data by the wedge application 330.

As evident by the user interface 650 in FIG. 6B, the wedge application 330 automatically formats the scanned barcode data with a prefix "000-" and a tab character '\t' appended to the end in the cell 652. The tab character is sent as key event <TAB>, which moves the focus to the next cell 654 on the right. This saves the scanner operator from having to manually tab to the next cell before performing the next scan, which saves time and effort, and can improve accuracy by reducing the likelihood of the operator typing or clicking on an incorrect key or cell.

Although FIGS. 6A and 6B illustrate examples of benefits that can be realized using one or more of the embodiments of this disclosure, various changes may be made to FIGS. 6A and 6B. For example, scanning operations can include various types of scans and various formatting and output rules, and these figures do not limit the scope of this disclosure. These figures are merely meant to illustrate example types of benefits that might be obtainable using the techniques described above.

It should be noted that the various functions and operations shown and described above with respect to FIGS. 3 through 6B can be implemented in the electronic device 101 in any suitable manner. For example, in some embodiments, at least some of the functions and operations can be implemented or supported using one or more software applications or other software instructions that are executed by the processor(s) 120, 240 of the electronic device 101. In other embodiments, at least some of the functions and operations can be implemented or supported using dedicated hardware components. In general, the functions and operations can be performed using any suitable hardware or any suitable combination of hardware and software/firmware instructions.

Figure 7:
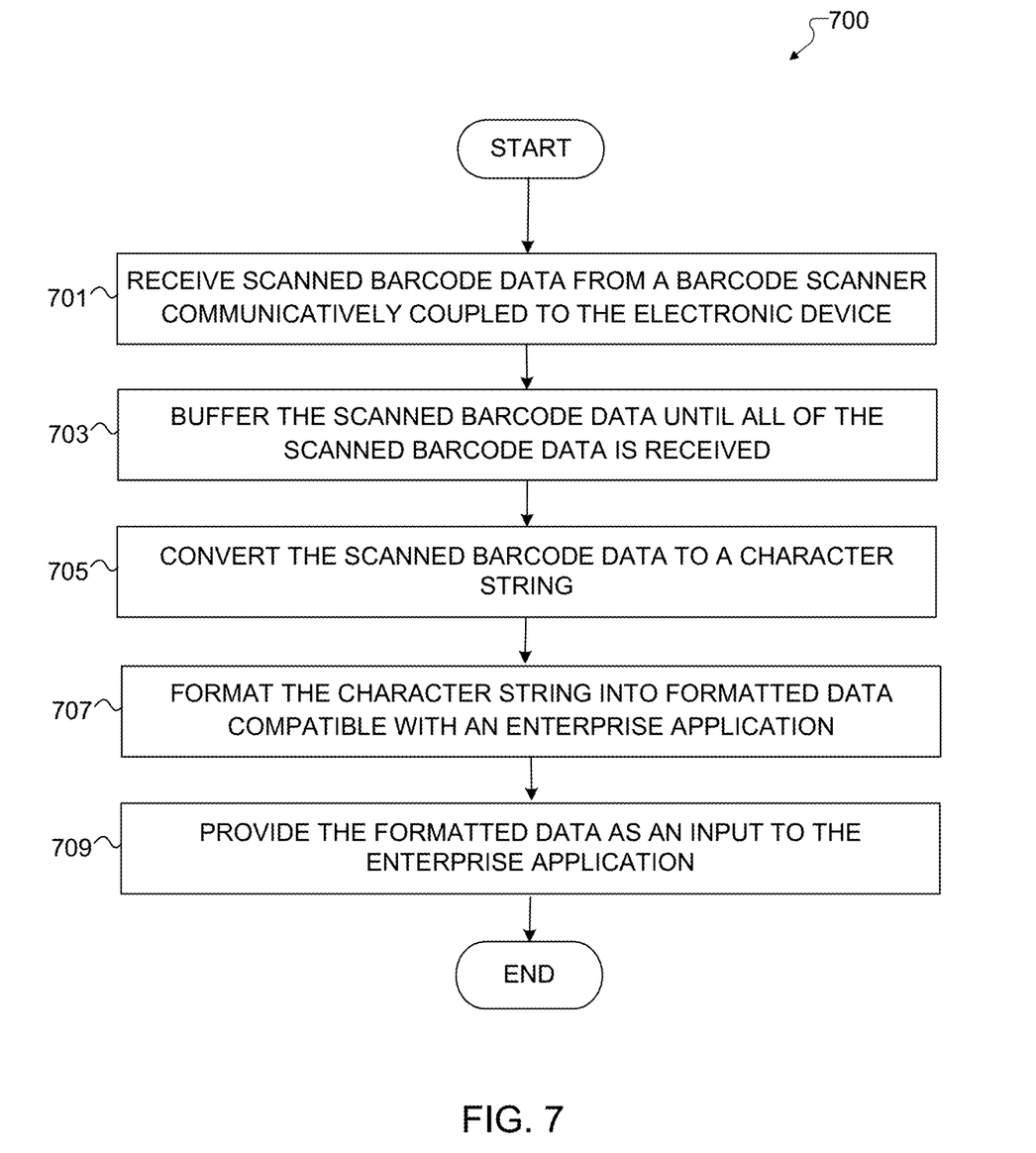
FIG. 7 illustrates an example method for integrating a barcode scanner with a wedge application according to this disclosure.

FIG. 7 illustrates an example method 700 for integrating a barcode scanner with a wedge application according to this disclosure. For ease of explanation, the method 700 shown in FIG. 7 is described as involving the system 300 shown in FIG. 3. The method 700 may be performed by an electronic device, such as the mobile device 302 of FIG. 3 or the electronic device 101 of FIG. 1. However, the method 700 could involve any other suitable system and be performed by any suitable device or system without departing from the scope of this disclosure.

At operation 701, the electronic device receives scanned barcode data from a barcode scanner communicatively coupled to the electronic device. This can include, for example, the mobile device 302 receiving scanned barcode data 312 as key events 314 from the barcode scanner 310.

At operation 703, the electronic device buffers the scanned barcode data until all of the scanned barcode data is received by the electronic device. This can include, for example, the mobile device 302 buffering the key events 314 until all of the key events 314 are received by the mobile device 302.

At operation 705, the electronic device converts the scanned barcode data to a character string. This can include, for example, the mobile device 302 converting the key events 314 to a character string 316.

At operation 707, the electronic device formats, while executing a wedge application, the character string into formatted data compatible with an enterprise application. This can include, for example, the mobile device 302 formatting, while executing the wedge application 330, the character string 316 into the formatted output data 318, which is compatible with the enterprise application 340.

At operation 709, the electronic device provides the formatted data as an input to the enterprise application. This can include, for example, the mobile device 302 providing the input data 319 as an input to the enterprise application 340.

Although FIG. 7 illustrates one example of a method 700 for integrating a barcode scanner with a wedge application according to this disclosure, various changes can be made to FIG. 7. For example, various steps in FIG. 7 could overlap, occur in parallel, occur serially, occur in a different order, or occur any number of times. Also, the steps of the method 700 could be implemented in any suitable manner, such as entirely within the electronic device 101 or using a combination of devices. For instance, the electronic device 101 could collect data and provide the data to a server 106, which could then process the data and generate any suitable output.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   receiving, at an electronic device, scanned barcode data from a barcode scanner communicatively coupled to the electronic device;
   converting, by the electronic device, the scanned barcode data to a character string;
   formatting, by the electronic device while executing a wedge application, the character string into formatted data compatible with an enterprise application, wherein the character string is formatted based on at least one specified data formatting rule used by the wedge application, wherein the at least one specified data formatting rule is configurable by an end user of the electronic device to indicate how the formatting is performed, and wherein the at least one specified data formatting rule specifies appending at least one of a prefix to a beginning of the formatted data or a suffix to an end of the formatted data; and
   providing, by the electronic device, the formatted data as an input to the enterprise application.

2. The method of claim 1, wherein the barcode scanner is communicatively coupled to the electronic device via a USB connection or a BLUETOOTH connection.

3. The method of claim 1, wherein:
   the scanned barcode data comprises multiple key events; and
   converting the scanned barcode data to the character string comprises converting the multiple key events to multiple characters comprising the character string.

4. The method of claim 1, further comprising:
   before converting the scanned barcode data to the character string, buffering the scanned barcode data until all of the scanned barcode data is received by the electronic device.

5. The method of claim 1, wherein the formatted data provided to the enterprise application is formatted as a second character string or as multiple key events.

6. The method of claim 1, wherein the enterprise application is executable on the electronic device.

7. The method of claim 1, wherein at least one of the prefix or the suffix is based on a user input.

8. The method of claim 1, wherein the at least one specified data formatting rule is configurable by the end user via at least one user input on a user interface displayed on the electronic device.

9. An electronic device comprising:
   at least one memory configured to store instructions; and
   at least one processor configured when executing the instructions to:
      receive scanned barcode data from a barcode scanner communicatively coupled to the electronic device;
      convert the scanned barcode data to a character string;

format, while executing a wedge application, the character string into formatted data compatible with an enterprise application; and provide the formatted data as an input to the enterprise application;

wherein, to format the character string into the formatted data, the at least one processor is configured to format the character string based on at least one specified data formatting rule used by the wedge application, wherein the at least one specified data formatting rule is configurable by an end user of the electronic device to indicate how the formatting is performed, and wherein the at least one specified data formatting rule specifies appending at least one of a prefix to a beginning of the formatted data or a suffix to an end of the formatted data.

10. The electronic device of claim 9, wherein the electronic device is communicatively coupled to the barcode scanner via a USB connection or a BLUETOOTH connection.

11. The electronic device of claim 9, wherein:
the scanned barcode data comprises multiple key events; and
to convert the scanned barcode data to the character string, the at least one processor is configured to convert the multiple key events to multiple characters comprising the character string.

12. The electronic device of claim 9, wherein the at least one processor is further configured, before converting the scanned barcode data to the character string, to buffer the scanned barcode data until all of the scanned barcode data is received by the electronic device.

13. The electronic device of claim 9, wherein the at least one processor is further configured to format the formatted data provided to the enterprise application as a second character string or as multiple key events.

14. The electronic device of claim 9, wherein at least one of the prefix or the suffix is based on a user input.

15. The electronic device of claim 9, wherein the at least one specified data formatting rule is configurable by the end user via at least one user input on a user interface displayed on the electronic device.

16. The electronic device of claim 9, wherein the enterprise application is executable on the electronic device.

17. A non-transitory computer readable medium containing computer readable program code that, when executed, causes at least one processor of an electronic device to:

receive scanned barcode data from a barcode scanner communicatively coupled to the electronic device;

convert the scanned barcode data to a character string;

format, while executing a wedge application, the character string into formatted data compatible with an enterprise application; and provide the formatted data as an input to the enterprise application;

wherein the computer readable program code that when executed causes the at least one processor to format the character string into the formatted data comprises:

computer readable program code that when executed causes the at least one processor to format the character string based on at least one specified data formatting rule used by the wedge application, wherein the at least one specified data formatting rule is configurable by an end user of the electronic device to indicate how the formatting is performed, and wherein the at least one specified data formatting rule specifies appending at least one of a prefix to a beginning of the formatted data or a suffix to an end of the formatted data.

18. The non-transitory computer readable medium of claim 17, wherein:

the scanned barcode data comprises multiple key events; and the computer readable program code that when executed causes the at least one processor to convert the scanned barcode data to the character string comprises:

computer readable program code that when executed causes the at least one processor to convert the multiple key events to multiple characters comprising the character string.

19. The non-transitory computer readable medium of claim 17, wherein the computer readable program code, when executed, further causes the at least one processor to:

before converting the scanned barcode data to the character string, buffer the scanned barcode data until all of the scanned barcode data is received by the electronic device.

20. The non-transitory computer readable medium of claim 17, wherein at least one of the prefix or the suffix is based on a user input.

* * * * *